July 31, 1956 — A. SENKOWSKI ET AL — 2,756,884
TRACTOR BORNE IMPLEMENT AND METHOD OF ATTACHING THE SAME
Filed May 18, 1953 — 6 Sheets-Sheet 1
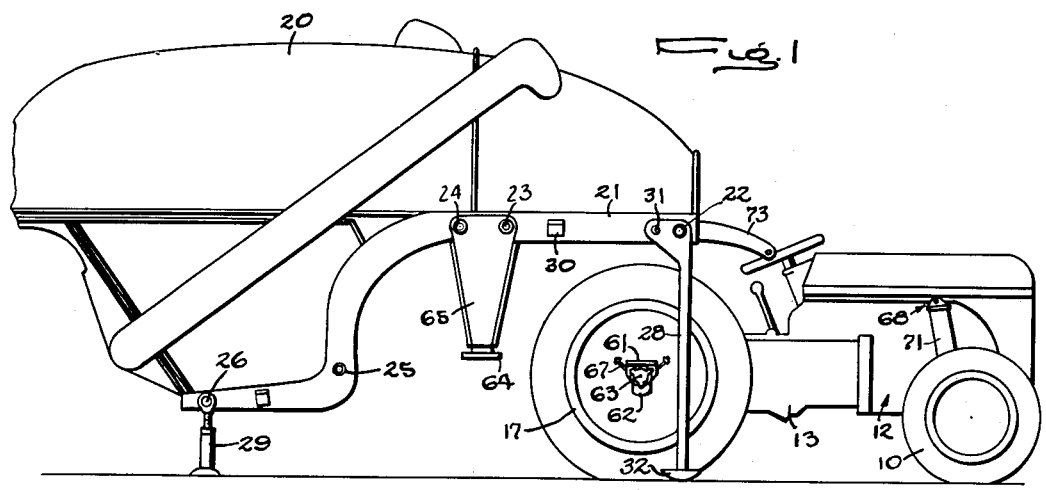
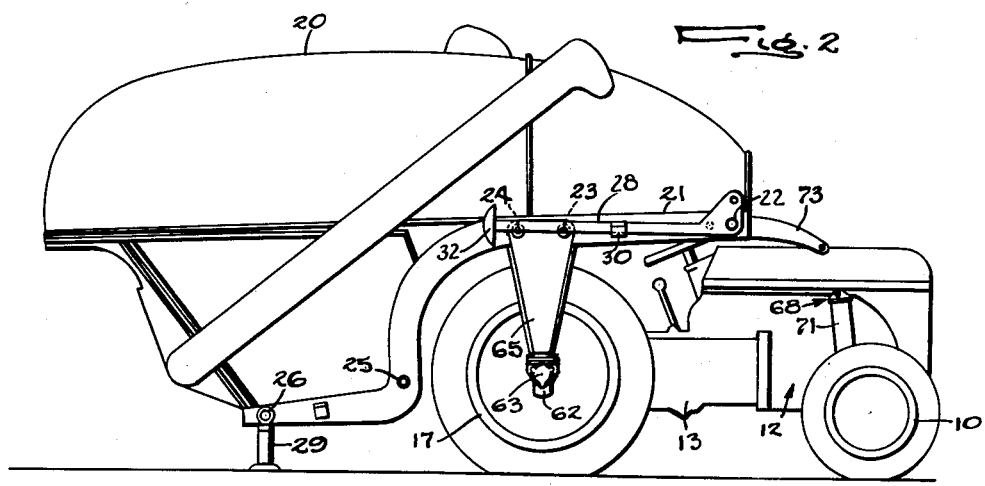
INVENTORS
Alexander Senkowski
Jerzy Belkowski
Carlson, Pitzner, Hubbard & Wolfe
ATTORNEYS

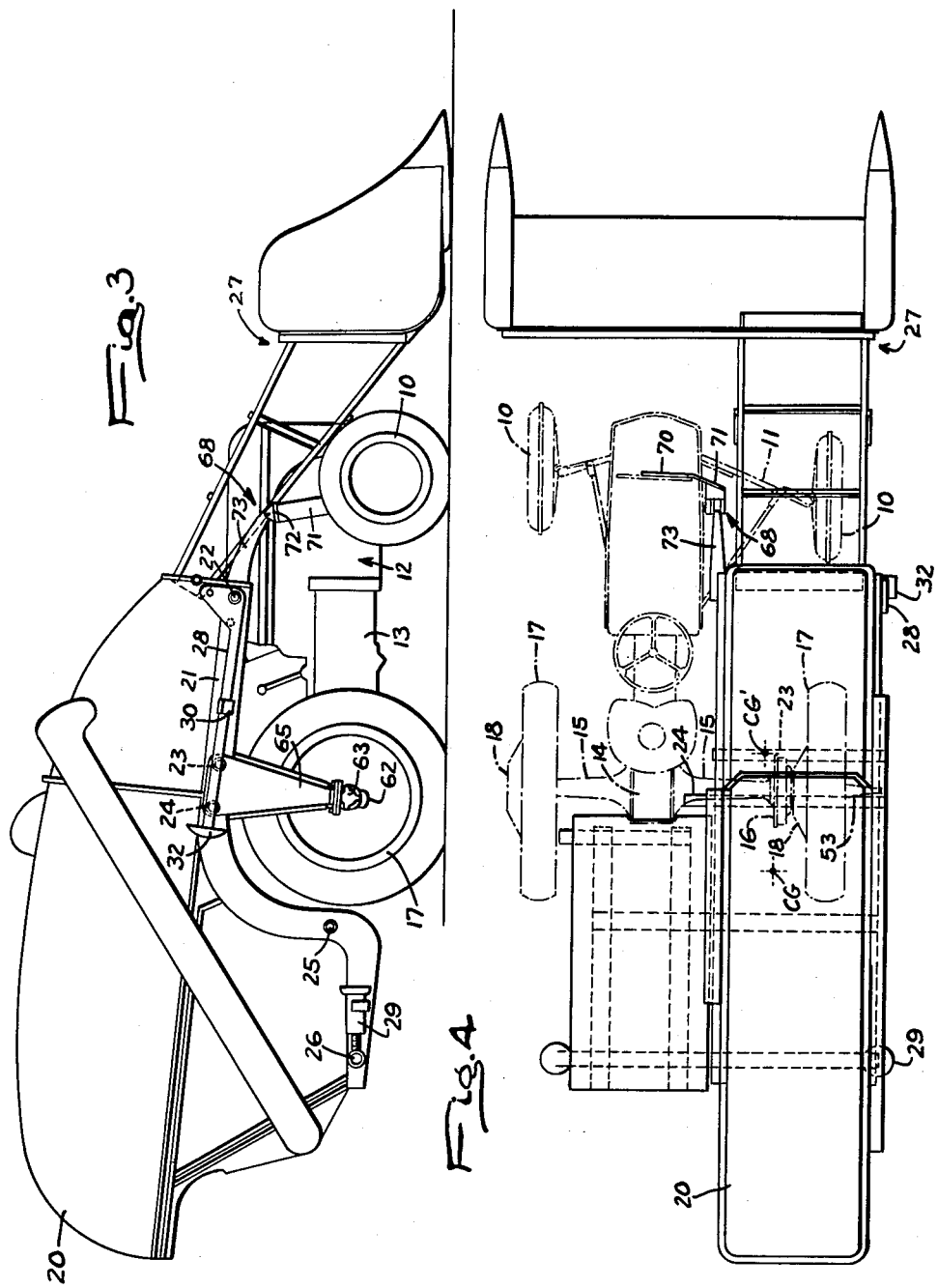

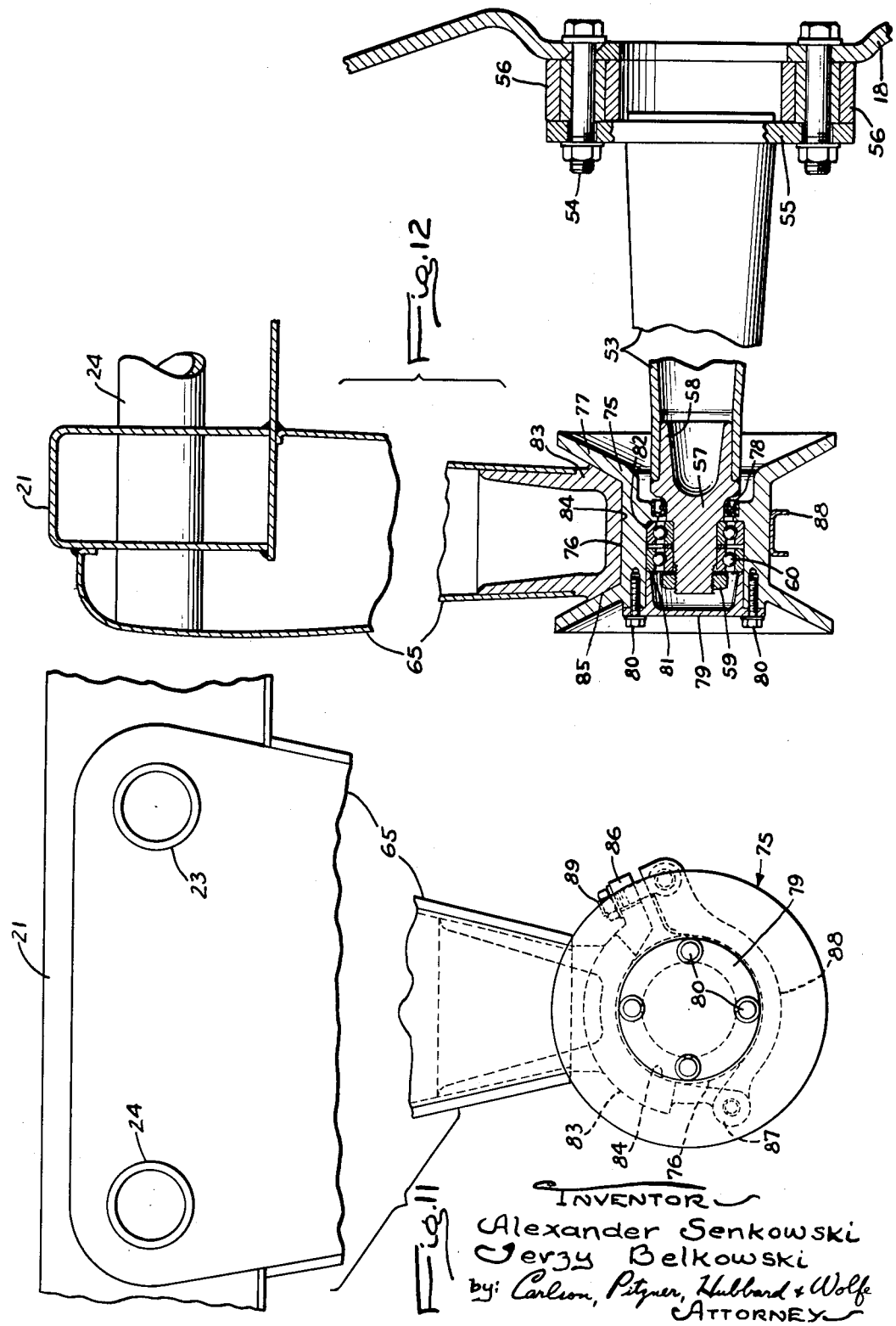

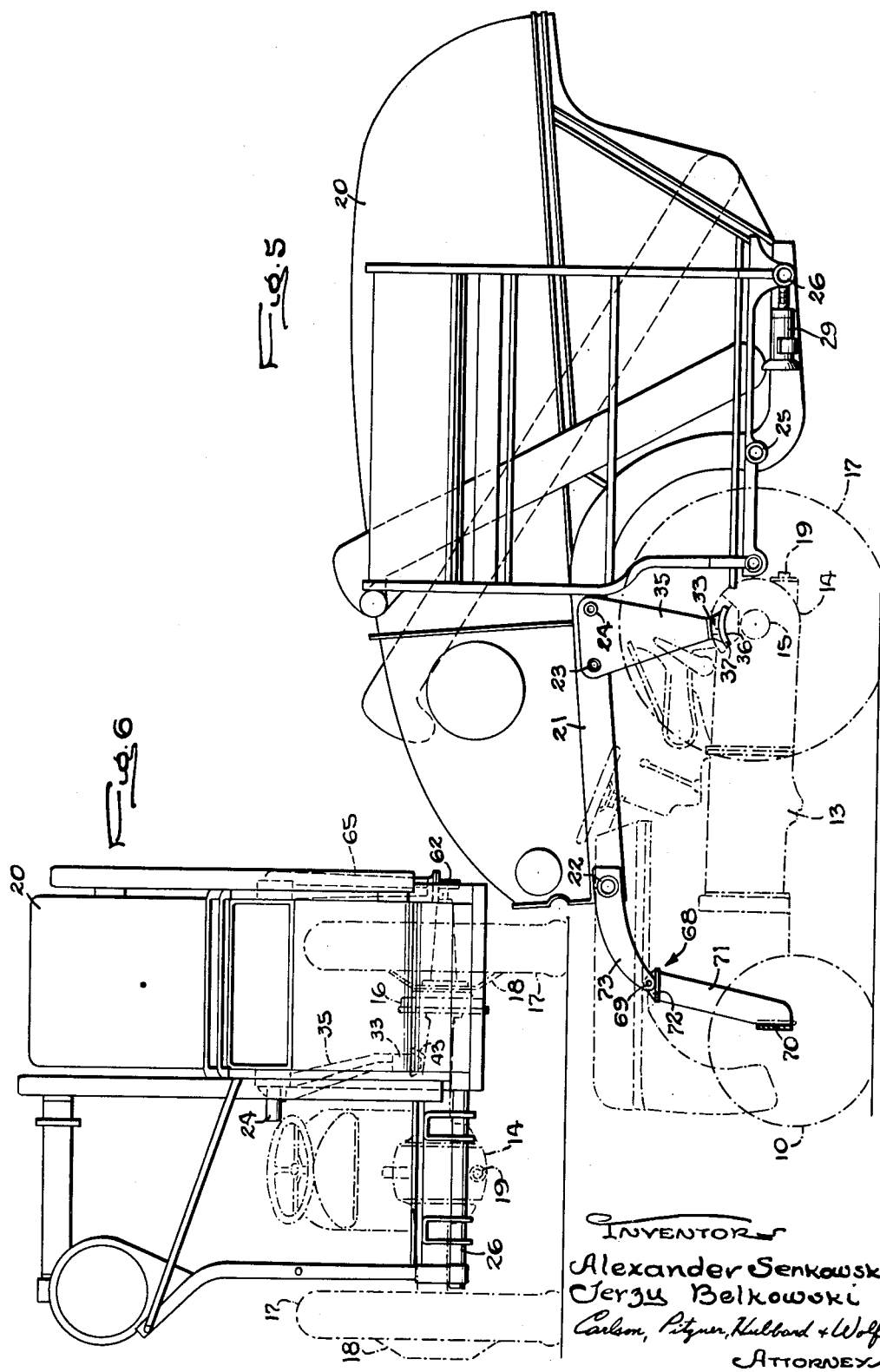

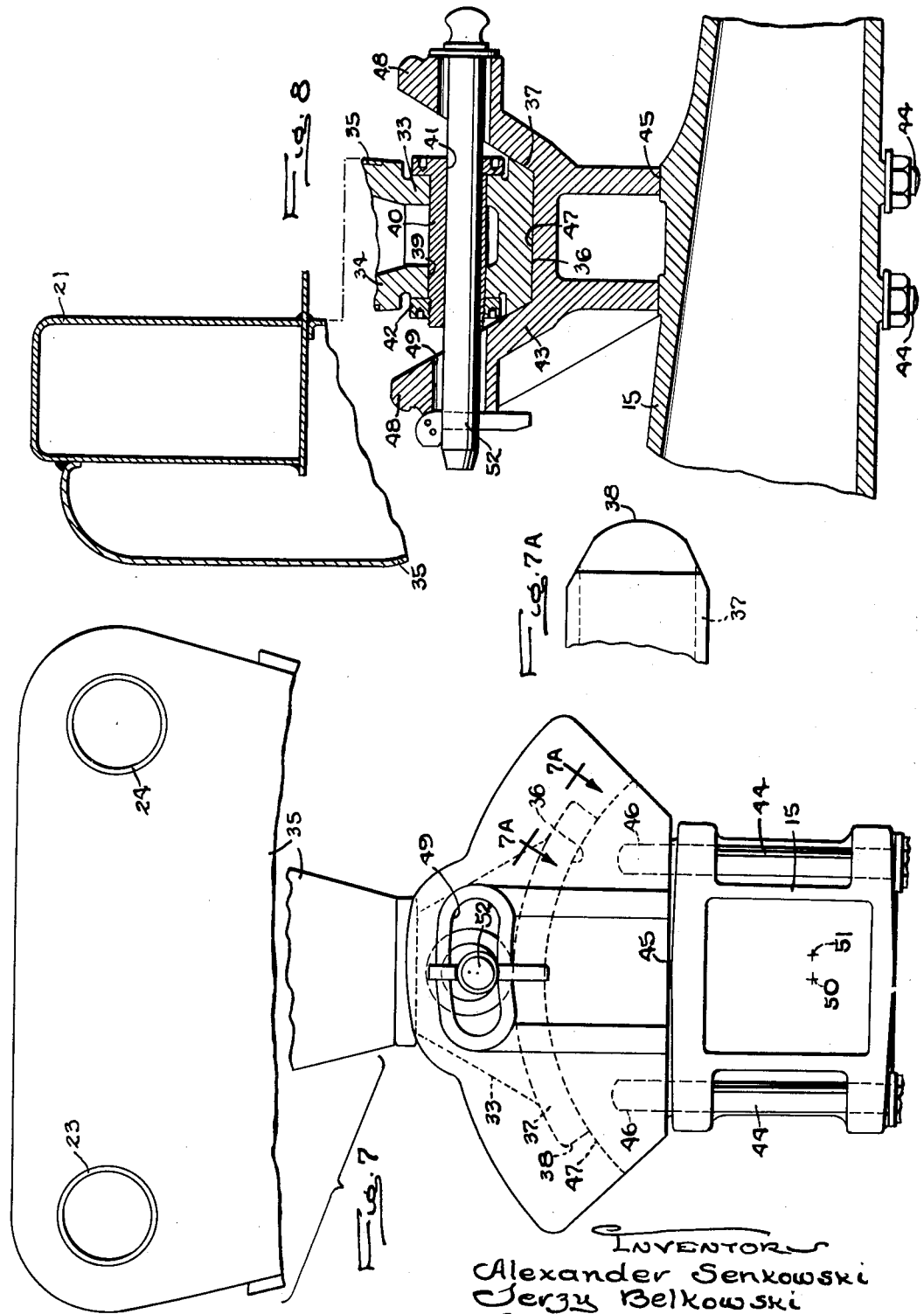

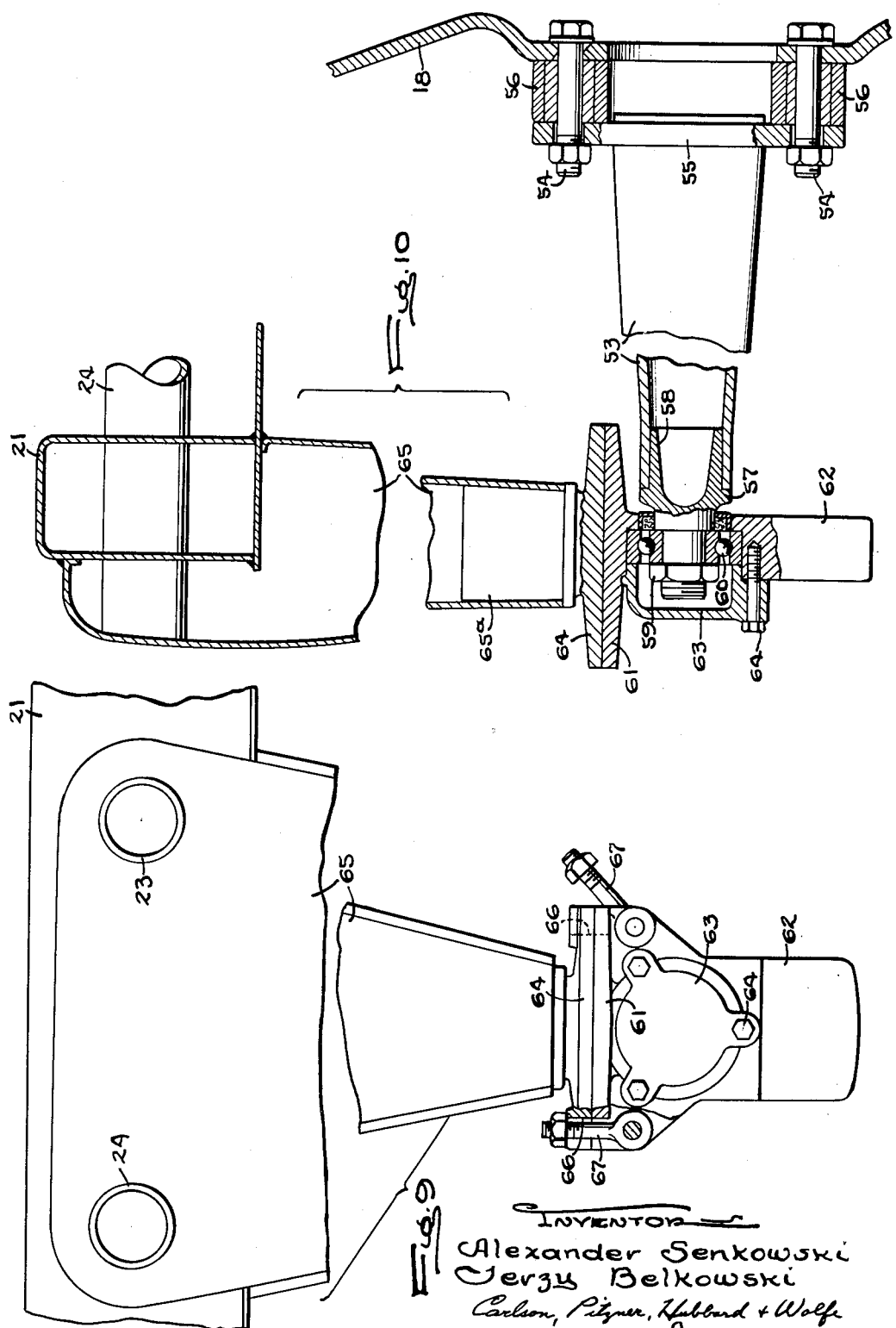

United States Patent Office 2,756,884
Patented July 31, 1956

2,756,884

TRACTOR BORNE IMPLEMENT AND METHOD OF ATTACHING THE SAME

Alexander Senkowski and Jerzy Belkowski, Earlsdon, Coventry, England, assignors to Massey-Harris-Ferguson (Sales) Limited, a British company Application May 18, 1953, Serial No. 355,686

Claims priority, application Great Britain May 20, 1952

13 Claims. (Cl. 214—500)

The present invention pertains to tractor borne implements and has particular utility with regard to large, bulky implements. The latter are of a size or weight that makes it nearly impossible to mount them on a rear end tractor hitch such as is often employed for plows or other smaller implements.

The attachment of large, bulky, and heavy implements to rear hitches on tractors for towing purposes is likely to introduce difficulties in maneuverability of both the tractor and the attached implement. In the past large and bulky implements have at times been manufactured as separate, self-propelled units adapted for only one purpose. These were quite expensive due to the necessity for the inclusion of power means and due to the fact that they often remained idle for considerable periods of time. In view of these factors, the need arises for mounting means for heavy and bulky implements which permit the implements to be quickly and easily mounted on a tractor for propulsion with a high degree of maneuverability of the tractor when so used, and yet, which make the implement easily and quickly removable from the tractor so that it may be readily available for other of its many uses.

The general aim of the present invention is to make possible the mounting and dismounting of large, bulky implements onto and from a tractor, in a manner that will minimize the effort required in the operation; which will assure accurate alinement of the implement relative to the tractor when in its mounted position; and which will provide for convenience of maneuvering and manipulation, and proper balance and stability of the implement once it is mounted so that the tractor can propel it without interference.

A further object has been to provide an implement having a coupling arrangement for effecting such simplified mounting and dismounting and which is rugged and simplified in construction so as to accommodate it for long, trouble-free use in the hands of farmers.

Still another object is to provide a coupling which will automatically accomplish alinement of an implement for engagement of the coupling, as well as locking of the coupling when it is engaged.

Further objects and advantages of the invention will become apparent as the following description proceeds, taken in conjunction with the accompanying drawings, in which:

Figures 1, 2 and 3 are side elevations of a tractor and combine to be mounted thereon, showing various stages of the mounting operation;

Fig. 4 is a top plan view of the combine mounted on the tractor, particularly illustrating the location of couplings and the disposition of the implement's center of gravity;

Figs. 5 and 6 are side and rear elevation views, respectively, corresponding to Fig. 4;

Fig. 7 is a side elevational view and Fig. 8 a rear elevational view in section of a coupling employed between the combine and the tractor in accordance with the invention;

Fig. 7A is a detail view of a part of the coupling shown by Fig. 7, taken in the direction of arrow 7A, Fig. 7;

Fig. 9 is a side elevational view and Fig. 10 a rear elevational view in section of another coupling employed between the combine and the tractor in accordance with the invention;

Fig. 11 is a side elevational view and Fig. 12 a rear elevation in section of still another coupling which may be employed between the combine and the tractor in lieu of that shown in Figs. 9 and 10.

Although a particular embodiment of the invention has been shown and described in some detail, there is no intention to thereby limit the invention to the details of such embodiment. On the contrary, the intention is to cover all alterations, modifications, and equivalents falling within the spirit and scope of the invention as defined in the appended claims.

Referring more particularly to the drawings, a combine has been shown (Fig. 3) as mounted, in accordance with the invention, on a tractor which those skilled in the art will recognize as the familiar "Ferguson" farm tractor. A variety of implements other than combines, such for example as forage harvesters, elevator loaders of the picker type, balers, corn pickers, green crop loaders, and root crop harvesters can be mounted by utilizing the present invention and, of course, the tractor itself may take a variety of forms.

The particular tractor illustrated in Figs. 1 through 6 is of the four wheel type, having front wheels 10 which are mounted on extensible front axles 11 secured to the engine assembly 12. A transmission housing 13 is connected between the engine and a rear differential or center housing 14 from which two flared half axle casings 15, carrying brake drums 16, extend. The front wheels 4, which turn for steering, are individually adjustable in tread width by means of an extensible front axle arrangement more fully shown and described in Ferguson Patent No. 2,247,725, issued July 1, 1941. The larger rear traction wheels 17 carried by dished hubs 18 secured to the brake drums 16 at the extremities of the half axle casings 15 are also individually adjustable in tread width, such adjustment being obtained in the well known manner by bolting the wheels on either side of the hubs, by reversing the wheel rims, and by removing and reversing the dished hubs. It will be apparent from Fig. 4 that in this instance the two right wheels of the tractor are in extended tread positions while the left wheels are in their normal tread positions, so that a high degree of stability results when the implement is attached to the right side of the tractor.

This tractor also includes a set of three hitch links (not shown) at the rear end for use in attaching other smaller implements during multifarious uses of the tractor. A power take-off shaft 19 also extends from the center housing 14 for supplying power from the tractor engine to various implements.

The combine shown in the various figures may take a variety of forms, the details of which are not important here. It is believed sufficient to note that the combine is a heavy and bulky implement having a superstructure or body 20 of a generally box-like character. The body, in the present instance, is supported on two spaced beams 21 extending fore and aft and curving downwardly in a rearward direction as shown particularly in Fig. 5. Several tubular cross members 22—26 extend between the two main beams for additional support and rigidity. A removable front header 27 is attached to the implement after mounting and during operation.

Provision is made for supporting the implement on the ground in an elevated position such that the tractor can be driven at least partially beneath it for ready coupling to the tractor by the means and method to be particularly described below. In the preferred form of the invention illustrated, the supporting provisions include a front support stand 28 and a pair of rear jacks 29, thus affording three-point support. The stand is located forwardly on one of the main support beams 21, and is attached pivotally to cross member 22 so it can be swung up and stowed alongside the beam and held there by clips 30. A pin 31 locks the stand in its upright or supporting position. A foot 32 on the stand is preferably curved for fore and aft rocking of the implement about such point. The vertical jacks 29 are attached to the rear ends of the beams. If desired, the jacks 29 may be pivoted on cross member 26 in a manner similar to that described for the front stand so that they may be clipped out of the way when not in use. The length of the jacks is adjustable by suitable manually or automatically operated mechanisms to raise and lower the rear portion of the implement, as described below. It will be noted that this three-point ground support for the implement gives good stability since the center of gravity CG without the header 27 attached is located within the triangle formed by lines connecting the three support points (Fig. 4). The implement may thus conveniently be stored when not in use and the tractor may be driven up to it for coupling purposes without any preliminary elevational adjustments.

Three couplings, each comprising a pair of mating elements, joint the implement to the tractor. Desirably, these couplings are located with one at the right rear axle housing 15 of the tractor, a second on an axle extension for that wheel, and a third forward alongside the right of the engine.

To couple up the outfit, the tractor is backed beneath the implement (Fig. 1) and the jacks 29 lower the rear of the implement until the rear couplings or at least the first coupling engages. Engagement of that coupling swivels the implement to aline the elements of the second coupling in a manner shortly to appear. The front stand 28 is next removed or clipped in its stored position (Fig. 2). Then the jacks 29 are raised again, rocking the implement forward about the two rear coupling points until the third coupling engages. Thereafter, the header 27 is attached to the front of the implement, shifting its center of gravity (Fig. 4) forward to a point CG' well within the triangle apexed by the couplings. The jacks 29 then can be stowed in transport position (Fig. 3).

As indicated above, once the implement is lowered toward the tractor to engage the first rear coupling, the engagement itself will automatically swivel or swing the implement into properly alined position for the other two couplings to become engaged, and indeed, will finalize the alinement of the parts for even the first coupling itself. A suitable form of coupling for effecting such initial engagement and automatic alinement is shown in Figs. 7, 7A, and 8. As shown, the upper element or foot 33 of the coupling presents upwardly extending spaced flanges 34 adapted to be secured, as by welding, to the inner surface of the lower end of a downwardly extending arm 35. The lower face of this foot 33 presents an arcuate mating surface 36 while the sides 37 of the foot are tapered and the ends 38 of the lower portion of the foot are chamfered and rounded as shown particularly in Fig. 7A. Intermediate the mounting flanges 34 and the lower mating surface 36 of the foot 33, a cylindrical opening 39 is provide to receive a bushing 40 having an eccentric hole 41 defined therethrough which is off center with respect to the external cylindrical surface of the bushing. The bushing may be secured in place by a suitable lock nut 42 which affords an adjustment of the elevation of the hole through the bushing by the expedient of temporarily loosening the lock nut and rotating the bushing 40 within its receiving opening.

The mating element or shoe 43 of the first coupling may be supported from the tractor axle by means of studs 44 extending upwardly from a flat 45 on the axle casing 15 and received within registering openings 46 in the shoe. In the "Ferguson" tractor illustrated such a flat is commonly provided at that point for bolting on the rear mud guard (not shown). Since the guard must needs be removed anyhow, it forms a convenient point for attachment of the coupling element. As shown in Figs. 7 and 8, an arcuate surface 47 is provided on the lower element or shoe to mate with the arcuate surface 36 of the foot. Upstanding inclined flanges 48 extend from the arcuate surface 47 to provide a cooperating mating socket for the slanted side surfaces 37 of the foot. There is defined through these upstanding inclined flanges an arcuate slot 49 located eccentrically with respect to the curved mating surfaces 36 and 47. That is, while the center of curvature of the two mating arcuate surfaces 36 and 47 may be and preferably is coincident with the axis of rotation 50 of the tractor axle, the center of curvature 51 for the arcute slot 49 is displaced slightly therefrom in a forward direction as shown in Fig. 7.

The two coupling elements may be brought into place with accurate alinement simply by slipping the foot 33 down into the shoe 43. Once mated, they may be locked in place by means of a pin 52 inserted through the arcuate slot 49 and the opening 41 of the bushing 40. It will be seen that even though the upper element 33 is not exactly alined with the lower element 43 as the two are brought into engagement, automatic adjustment will be afforded in a direction along the tractor axle as viewed in Fig. 8 by virtue of the camming of the slanted surfaces 37 and 48 on each other, resulting in a sliding and shifting of the foot 33 in a direction endwise of the axle until it rests firmly in the shoe 43. Similarly, in a direction transverse to the axle casing, the two arcuate mating surfaces 36 and 47 (Fig. 7) will cause shifting of the foot in a fore and aft direction as they come into contact. In other words, even if either the forward or rear edge of the upper mating surface 36 on the foot is located either to the front or to the rear, respectively, of the highest point on the shoe, a sliding and matching effect will take place properly shifting the foot in a fore and aft direction until full mating is obtained along the arcuate surfaces 36 and 47. In the event the foot 33 should be skewed in a horizontal plane with respect to the shoe 43 the chamfered and rounded ends 38 (Fig. 7A) of the foot will slidably engage the inclined flanged surfaces 48 of the shoe, aiding in swiveling the foot 33 into proper position.

With the two coupling elements resting in engagement, the coupling provides a pivot for fore and aft rocking by virtue of the sliding of the mating surfaces 36 and 47. The two elements may, however, be locked against vertical displacement by means of the locking pin 52.

The particular self-alined and self-adjusting coupling described above is, in the illustrated installation, employed at the first coupling point. While a similar coupling element may be employed at the second coupling point and thus afford even greater self-alining ability, the second coupling can usually be, and as shown in this instance is, of a different and simpler nature. Thus, as shown in Figs. 9 and 10, a hollow axle extension casing 53, secured by bolts 54 extending through an annular flange 55 on the inner end thereof and through a spacer 56 to engage the wheel hub, has at its outer end a lower element of the second coupling. This lower element includes a support member 57 having a portion 58 extending into the axle extension 53 and secured, as by welding, and which has secured thereon, by a suitable lock nut 59, a bearing 60 freely journaling a lower support plate or pad 61 with an attached, depending tail weight 62. A cover plate 63 secured by three bolts 64 engaging the lower plate 61 and tail weight 62 secures the assembly as shown. A downwardly extending arm 65 which is fastened at its upper end to the frame of the combine (Fig. 1) carries a mating upper element or plate 64 having an upward extension 65a secured to the arm 63, as by welding. The upper and lower mating plates 61 and 64 are adapted to be conveniently locked together when placed in proper registry, as for example by means of slots 66 therein engageable by swing bolts 67 pivotally mounted in the lower coupling element.

Although the axle extension 53 rotates with the tractor wheel, the lower support plate 61 will always remain in a horizontal position so as to be engageable with or remain engaged with the upper plate 64 of the other coupling element due to the journal mounting and the tail weight 62. Further, by virtue of the flat mating surfaces of the upper and lower coupling elements, any automatic adjustment or alinement at the time of the engagement of the inboard coupling, will be accommodated simply by a relative sliding of these two flat mating surfaces.

The forward coupling 68 may comprise simply clevis type elements as shown (Fig. 5) adapted to be locked by a pin 69 when brought into proper engagement. More fully, a transverse bracket 70 secured to a shoulder beneath the front portion of the engine carries, in turn, an upstanding bracket 71 having two vertically spaced flanges or clevis jaws 72 with registering holes in them. A cooperating element, such as a downwardly curving arm 73 may be secured to the front of the combine or other implement in a position to be brought into the clevis and locked by the pin 69 inserted through registering holes in the arm clevis. Once this forward coupling 68 is engaged and locked with the pin, the combine or implement is restrained against further rocking about the rear coupling points.

The pin 52 in the eccentric arcuate slot 49 (Fig. 7) serves to lock the inner, rear coupling against separation or chatter, once the implement has been rocked forward into its fully mounted position. Thus, with the locking pin 52 in place, as the foot 33 is rotated or slid forwardly, the locking pin becomes jammed in the arcuate slot 49 because of the latter's eccentric location. This both limits the maximum travel of the upper element 33 in sliding along the arcuate surface 47 of the lower element 43 and also positively clamps the two elements together so that there can be no vertical play. The point at which such locking or jamming occurs may be adjusted by changing the elevation of the locking pin 52 with respect to the mating surfaces. This may be done as described above by loosening the lock nut 42 for the bushing 40 in the upper element, and rotating the bushing so that the off-center opening is relocated as desired.

The operation of the coupling mechanisms shown will, in general, now be clear from the foregoing description. By way of recapitulation, however, and to set forth the method of mounting the implement on the tractor in still further detail, it may be observed that the implement is mounted by driving the tractor, preferably by backing, partially beneath the implement which is supported in an elevated position as shown in Fig. 1. When the coupling elements for the three couplings which are located on the tractor are in approximate alinement with those corresponding coupling elements on the implement, the rear jacks 29 are ratcheted to lower the rear portion of the combine or implement by pivoting action about the foot 32 of the forward stand 28. This in turn causes the upper elements of the two rear couplings to be lowered into engagement (Fig. 2). As described hereinbefore, if the elements are not in exactly proper alinement, the inboard rear coupling will cause automatic alinement of all three couplings as they are lowered into position. While this self-adjustment is taking place the two flat mating plates 61 and 64 of the outboard coupling elements may come together and slide relative to one another. Thus, once the jacks 29 have been lowered sufficiently to bring the rear coupling elements together, it is necessary only to insert the locking pin 52 in the inboard coupling and to fasten the swing bolts 67 of the outboard coupling.

Next, the forward stand 28 on the combine or implement may be swung up to a transport position on the body of the implement, and the jacks 29 in the rear raised to rock or pivot the entire implement about the two rear coupling points. During this forward rocking, the two arcuate mating surfaces 36 and 47 of the inboard coupling slide relative to one another and, of course, the entire outboard coupling rotates relative to the axle extension 53 by means of its bearing mounting. When the rear jacks 28 have been elevated sufficiently, the forward coupling elements will come into registry so that the locking pin 69 may be inserted therethrough. The jacks 29 may then be clipped up onto the frame of the implement, and the tractor and implement are ready for travel as a unit (Fig. 3).

By a predetermined adjustment of the bushing 40, the locking pin 52 through the inner, rear coupling can be located for jamming in the arcuate slot 49 at about the same time that the forward coupling elements engage. This then provides still further restraint against additional forward rocking and positively prevents vertical movement between the elements of the self-adjusting coupling.

Conversely, the dismounting and disengaging of the combine or implement from the tractor proceeds in essentially reverse and opposite sequence of operations. The tractor may thus be quickly and conveniently combined for use with the implement or freed for any other of its many uses.

As shown in Figs. 4 and 5, the center of gravity of the implement without the front header section 27 attached is located aft of the two rear coupling points at CG. This provides for stability in the rocking of the implement forwardly after the two rear couplings have become engaged and during engagement of the front coupling. There is no tendency to overbalance in a forward direction during this operation and the jacks may operate with efficiency in lifting the implement into its proper position. However, after the three couplings between the tractor and the implement have been engaged and locked as described above, the header section 27 may be attached to the implement, thereby shifting the center of gravity forward until it lies at CG' within a triangle having the three coupling points as apexes. With the center of gravity thus located within this triangle during the use and operation of the implement and tractor together, a high degree of stability results, yet it will be seen that the implement does not impair the operation or maneuverability of the tractor to any appreciable extent.

While the details of supplying power to the working parts of the tractor borne implement have not been shown and described in detail and are of no great import in connection with the present invention, it will be understood by those reasonably skilled in the art that a suitable connection between the power take-off shaft 19 to the implement may be made for this purpose, or a separate engine may be employed.

Turning now to Figs. 11 and 12, there is shown a modified form of second coupling, which may be advantageously utilized at the outboard coupling point as an alternative for the coupling shown in Figs. 9 and 10. To the extent that similar parts are used, the same reference numerals used in Figs. 9 and 10 appear in Figs. 11 and 12. The alternative outboard coupling will thus be seen to include a hollow axle extension casing 53 secured to the tractor wheel hub, with a support member 57 at its outer end carrying bearings 60 locked by nut 59, as described above. The bearings 60 freely journal an annular lower element or shoe 75 having a cylindrical surface 76 and radially extending inclined flanges 77. A lubricant seal 78 may be disposed at the inner side of bearings 60, and a closure cap 79 locked by bolts 80 threaded into shoe 75. An extension 81 of the cap 79 and an inner shoulder 82 on the shoe secure it against axial displacement on the bearings 60.

The arm 65 depending from the implement carries a cooperating coupling element or foot 83 formed in the general shape of an arc to present an arcuate surface 84 for mating with the surface 76 of the shoe as shown. The foot further includes tapered sides 85 for cam-like cooperation with the inclined flanges 77, together with a slotted radial projection 86 and an apertured lug 87 at its respective ends. The foot 83 is preferably oriented in a tilted position so that the under-surface of the projection 86 is inclined downwardly toward the rear of the implement as shown, permitting the foot to ride over the shoe and into mating engagement as the implement is moved forward and downward with respect to the tractor during the coupling operation.

The mating configuration of the shoe 75 and foot 83 augments automatic alinement of the tractor and implement as the two are lowered into engagement. The inclined flanges 77 and tapered sides 85 cam together to result in a relative sliding and shifting of the foot 83, in a direction endwise of the axle, until it rests firmly in the shoe; the arcuate mating surfaces 76 and 84 also provide for relative shifting in a direction transverse to the axle and fore and aft along the tractor, in the same manner as that described with reference to the first coupling. It is therefore not necessary that the coupling elements be accurately alined before being brought vertically into engagement since the combined action of the first (inboard) and second (outboard) couplings automatically serves to shift the implement and coupling elements until they fully mate.

As shown best in Fig. 11, the foot 83 of the modified outboard coupling may be locked against vertical play in its shoe 75 by an arcuate clamp member 88 pivotally pinned to the lug 87 and carrying a swing bolt 89 at its other end for engaging the slotted projection 86. After the foot 83 and shoe 75 are engaged, it is only necessary that clamp member 88 be swung up to embrace the shoe as shown, and that the swing bolt 89 be swung into the slotted projection 86 and tightened. Since the shoe 75 is circular, it is always in a proper position to receive the foot 83, and because it is rotatably mounted by the bearings 60 on the axle projection 53, it may remain stationary with respect to foot 83 even though axle projection 53 rotates as the tractor is driven. Also, in the operation of coupling the implement to the tractor, after the shoe 75 and foot 83 are engaged, they provide a pivot about which the implement may be rocked in a fore and aft direction through the operation of jacks 29, since the shoe 75 rotates freely on bearings 60.

Either the coupling shown in Figs. 9 and 10 or that shown in Figs. 11 and 12 may thus be used at the outboard location on an axle extension, the latter serving to supplement the self-adjusting action of the inboard coupling. Both forms provide for relative rotation of the axle extension to permit rocking of the implement during the mounting operation, and vertical support as the tractor is driven with the implement mounted.

We claim as our invention:

1. In a tractor borne agricultural implement, the combination of a supporting frame having a bulky superstructure thereon, the fore portion of said frame being raised to afford a substantial clearance beneath it permitting at least partial entry of a tractor therebeneath, means providing a three-point ground support for the implement including a front stand and a pair of rearwardly located, elevatable jacks, said stand and jacks each being pivoted to said frame to be swung into transport positions thereon, and a set of three pivotal couplings each having an element on the underside of said frame and adapted to engage with a corresponding element on a tractor, and two of said couplings being disposed at the rear portion of the implement but spaced forwardly of said jacks and rearwardly of said front stand and in transverse alinement with each other, said two couplings having means to afford fore and aft rocking of the implement about the same as an incident to elevation of said jacks to thus lower the fore portion of said frame and bring about engagement of the third coupling.

2. The combination of an implement having means for supporting the same in an elevated position from the ground with clearance beneath at least a portion of the same for at least partial entry of a tractor therebeneath, a pair of disengageable pivotal couplings, each having a pair of complemental elements one of which is attached to the implement and the other adapted to be fixed to a tractor, means for supporting said other coupling elements at points respectively inboard and outboard of a tractor's rear traction wheel, a third disengageable coupling having a pair of elements adapted to be attached respectively to the forward underside of the implement and to a forward point on a tractor, and means for rocking said implement relative to the tractor in a fore and aft direction about the first mentioned pair of couplings upon engagement of the same and in a direction to bring the elements of said third coupling into engagement.

3. The combination with an implement having means for supporting the same in an elevated position from the ground with clearance beneath at least a portion of the same for at least partial entry of a tractor therebeneath, of first and second disengageable couplings each having a pair of complemental elements one of which is attached to the implement and the other adapted to be fixed to a tractor, said coupling elements being spaced part on the implement and tractor, and means for rocking said implement about one of said couplings as a pivot upon engagement of the same and in a direction to bring the elements of the other coupling into engagement.

4. In apparatus for mounting a bulky implement on an agricultural tractor, the combination comprising a removable front stand and a removable rear jack for supporting the implement above the ground with considerable clearance such that the tractor may be driven at least partially beneath the implement, two disengageable pivot couplings having cooperating elements adapted for attachment respectively to the tractor and the underside of the implement forwardly of said jack but rearwardly of said stand, said two couplings thus being engageable upon lowering said jack to rock the implement rearwardly about said front stand as a pivot, and a third disengageable coupling having cooperating elements adapted for attachment respectively to the tractor and the underside of the implement at a point spaced forwardly of said two pivot couplings, so that those elements are brought into engagement upon removal of said stand and elevation of said jack to rock the implement forwardly about said two pivot couplings as a fulcrum, whereupon said jack may be removed to leave the implement fully mounted on the tractor.

5. The combination with an implement having means for temporarily supporting the same on the ground with space therebeneath for at least the partial entry of a tractor, of three disengageable couplings each having a pair of mating elements arranged with one element of each coupling attached to the implement on its underside at the apexes of a triangle, means for attaching the remaining elements of said couplings in a corresponding triangular configuration on a tractor, means for lowering the implement to sequentially engage the elements of said couplings, the elements of at least one of said couplings having means including coacting inclined faces in one direction and arcuate faces in another direction thereon for adjusting the implement relative to the tractor, as an incident to engagement of such elements, into a position in which the elements of all three couplings are in alinement.

6. The combination with an implement having means for temporarily supporting the same from three spaced points on the ground enclosing the center of gravity of the implement and with space therebeneath for at least the partial entry of a tractor, of three couplings each having a pair of mating elements arranged with one element of each coupling attached to the implement on its underside at the apexes of a triangle forward of the implement center of gravity, means for attaching the remaining elements of said couplings in a corresponding triangular configuration on a tractor, means for lowering the implement at its two aft ground support points to pivot it about the third ground support point to lower the elements of the two aft couplings into engagement, the elements of at least one of said aft couplings having means including coacting arcuate faces curved fore and aft and coacting transversely inclined faces thereon for adjusting the implement relative to the tractor, as an incident to engagement of such elements, into a position in which the elements of all three couplings are in alinement, means to rock the implement forward about said two aft couplings to engage the third forward coupling, and a forward implement section adapted for attachment to the fore portion of said implement to shift its center of gravity forward of said two aft couplings.

7. In an implement attachment arrangement of the type described, a coupling including two mating elements adapted to be engaged upon the lowering of one into the other, said elements presenting generally arcuate mating faces arranged to self-aline themselves in a first direction along the direction of curvature upon the lowering engagement, and upstanding inclined surfaces arranged to cam on each other to shift and self-aline the elements in a direction transverse to said direction of curvature upon the lowering engagement, one of said elements having an arcuate slot therein arranged slightly eccentric to the arcuate faces on such elements, the other of said elements having a bushing therein defining an off-center opening therethrough in registry with a portion of said slot, and means including a removable locking pin entered through said slot and hole for preventing separation of said elements, said pin being arranged for jamming of the same against the slot edges to lock said elements tightly against separation when the elements are relatively rocked on said arcuate mating surfaces, the point of said jamming being adjustable by changing the location of said bushing opening by relative rotation of the bushing in said other element.

8. The method of attaching an implement having a bulky superstructure in carried position on a tractor, said method comprising the steps of supporting the implement in a position elevated from the ground by front and rear ground engaging supports, driving the tractor at least partially beneath the implement, lowering the rear portion of the implement causng it to rock rearwardly about the front ground support to thus engage a pivotal coupling having cooperating elements on the rear of the tractor and the underside of the implement, removing the front ground support, raising the rear portion of the implement causing it to rock forwardly about the pivotal coupling to engage a second coupling having cooperating elements at the front of the tractor and the underside of the implement, and removing said rear ground support.

9. The method of attaching an implement having a bulky superstructure in carried position on a tractor, which comprises supporting the implement temporarily in an elevated position from the ground, backing the tractor at least partially beneath it, lowering the implement to engage a fore and aft pivotal connection between the rear portion of the tractor and a point on the underside of the implement located forwardly of the center of gravity of the implement, rocking the implement forward about its pivotal connection, fixing its fore portion to the tractor in such forwardly rocked position, and attaching a front section to the implement which shifts its center of gravity forward of the point of pivotal connection.

10. The method of attaching an implement having a bulky superstructure in carried position on a tractor, which comprises supporting the implement temporarily in an elevated position from the ground at points spaced fore and aft of the implement and by extensible means at the rearward point, backing a tractor at least partially beneath the implement, rocking the implement rearwardly to lower the rear portion of the implement by contracting said extensible means to thereby engage a pivotal connection between the rear portion of the tractor and the implement, again extending said extensible means to rock the implement forwardly about the pivotal connection, and fixing the fore portion of the implement to the tractor in such forwardly rocked position.

11. In an implement attachment of the type described, a coupling comprising, in combination, a shoe element having a first arcuate surface and upstanding flanges bordering two sides of said surface and inclined axially outward, a foot element having a second mating arcuate surface and tapered side portions adapted to interfit with said flanges, said foot and shoe elements being self-adjusting to mate upon being brought together although not accurately prealined, said first and second arcuate surfaces causing relative shifting of said foot and shoe elements in a tangential direction, said tapered side portions and inclined flanges causing relative shifting of said foot and shoe elements in an axial direction, and means for locking said foot and shoe elements against separation.

12. In an implement attachment arrangement of the type described, a coupling comprising the combination of an annular shoe element having a cylindrical surface, radially upstanding and axially outwardly inclined flanges bordering said cylindrical surface, means for rotatably mounting said shoe element on a first part to be coupled, a foot element having a concave arcuate surface adapted to mate with a portion of said cylindrical surface and tapered side portions adapted to mate with said inclined flanges, means for mounting said shoe element on a second part to be coupled, said foot and shoe elements being self-adjusting upon the engagement of one with the other without accurate prealinement to matingly engage, an arcuate clamp member, and means for removably fastening said clamp member to said arcuate shoe to embrace said cylindrical surface and lock said foot and shoe elements together, said means for rotatably mounting said shoe element affording relative rotation of said first and second coupled parts.

13. For use with a tractor and a bulky implement, means for mounting the implement on the tractor comprising, in combination, an axle extension adapted to be secured to a rear axle of a tractor and extend outwardly from a rear wheel of the tractor, a first disengageable coupling having cooperating elements adapted to be secured to an axle casing of the tractor inboard of the rear wheel and to the underside of the implement respectively, a second disengageable coupling having elements adapted to be secured to said axle extension outboard of the rear wheel and to the underside of the implement respectively, a third disengageable coupling having elements adapted to be secured on the tractor spaced in a fore and aft direction from said first and second couplings and to the underside of the implement respectively, said coupling elements being spaced to register and to engage or disengage upon lowering or raising of the implement relative to the tractor, and jack means for supporting said implement from the ground to permit at least partial entry of the tractor therebeneath and for lowering or raising the implement.

References Cited in the file of this patent

UNITED STATES PATENTS

| | | |
|---|---|---|
| 738,884 | Clay | Sept. 15, 1903 |
| 2,304,622 | Barrett | Dec. 8, 1942 |
| 2,376,541 | Johnson et al. | May 22, 1945 |
| 2,401,183 | Pool et al. | May 28, 1946 |
| 2,446,883 | Pool et al. | Aug. 10, 1948 |
| 2,452,937 | Krake | Nov. 2, 1948 |
| 2,520,144 | Holsclaw | Aug. 29, 1950 |